United States Patent
Bellante

(10) Patent No.: US 9,758,265 B2
(45) Date of Patent: Sep. 12, 2017

(54) GRIPPING HEAD FOR A ROBOT OR MANIPULATOR OF A CARTONING MACHINE

(75) Inventor: Daniele Bellante, Garbagnate Monastero (IT)

(73) Assignee: CAMA1 S.p.A., Milan (IT)

( * ) Notice: Subject to any disclaimer, the term of this patent is extended or adjusted under 35 U.S.C. 154(b) by 365 days.

(21) Appl. No.: 13/335,074

(22) Filed: Dec. 22, 2011

(65) Prior Publication Data

US 2012/0230809 A1 Sep. 13, 2012

(30) Foreign Application Priority Data

Mar. 11, 2011 (EP) ..................................... 11157856

(51) Int. Cl.
| | |
|---|---|
| B25J 15/00 | (2006.01) |
| B65B 5/08 | (2006.01) |
| B65B 5/10 | (2006.01) |
| B65G 47/91 | (2006.01) |

(52) U.S. Cl.
CPC ............. *B65B 5/08* (2013.01); *B25J 15/0052* (2013.01); *B65B 5/105* (2013.01); *B65G 47/918* (2013.01)

(58) Field of Classification Search
CPC ........ B65B 5/08; B65B 5/105; B25J 15/0052; B65G 47/918
USPC .... 414/783, 627, 737, 752.1, 773, 774, 776, 414/816; 901/40; 294/184, 65; 53/238, 53/247
See application file for complete search history.

(56) References Cited

U.S. PATENT DOCUMENTS

| | | | | |
|---|---|---|---|---|
| 3,058,271 | A | | 10/1962 | McGihon |
| 3,253,694 | A | * | 5/1966 | Kinney ................ B65G 47/244 198/374 |
| 3,753,509 | A | * | 8/1973 | Kock ........................ 414/416.05 |
| 3,788,463 | A | * | 1/1974 | Ruff ........................ B65D 71/08 206/432 |
| 3,951,283 | A | * | 4/1976 | Lingl, Jr. ..................... 414/802 |

(Continued)

FOREIGN PATENT DOCUMENTS

| | | |
|---|---|---|
| DE | 3513507 | 11/1985 |
| EP | 0163092 | 12/1985 |

(Continued)

OTHER PUBLICATIONS

"NPL—Exhibits A-D"; static screen shots captured from the Polypack videos identified in the Polypack website, 2007; http://webarchive.org/web/20080509065326; and as described in the Polypack Affidaivt.*

(Continued)

*Primary Examiner* — Michael McCullough
*Assistant Examiner* — Lynn Schwenning
(74) *Attorney, Agent, or Firm* — Dorsey & Whitney LLP

(57) ABSTRACT

A gripping head for a loading robot or manipulator of a cartoning machine capable of nesting articles arranged on two substantially parallel rows, the gripping head comprising a row of gripping members, wherein each of the gripping members comprises a gripping section adapted to receive two adjacent articles and on opposite sides with respect to a centerline plane, and wherein at least the gripping members having even index position or odd index position in the row rotate by about 180 degrees around an axis.

17 Claims, 4 Drawing Sheets

(56) References Cited

U.S. PATENT DOCUMENTS

| | | | | |
|---|---|---|---|---|
| 4,119,211 | A | * | 10/1978 | Boyer et al. .................. 414/591 |
| 4,164,296 | A | * | 8/1979 | Trees ...................... 414/416.02 |
| 4,435,941 | A | * | 3/1984 | Booth .................. B65B 25/046 53/247 |
| 4,444,424 | A | * | 4/1984 | Lebret .......................... 294/87.1 |
| 4,658,575 | A | † | 4/1987 | Lousberg |
| 4,731,977 | A | * | 3/1988 | Maekawa ....................... 53/443 |
| 4,771,589 | A | | 9/1988 | Mueller |
| 4,977,727 | A | † | 12/1990 | Milleson |
| 5,079,903 | A | * | 1/1992 | Hakansson ..................... 53/473 |
| 5,147,177 | A | | 9/1992 | Kikuchi et al. |
| 5,641,051 | A | † | 6/1997 | Bergmann |
| 5,943,842 | A | * | 8/1999 | de Koning et al. ............ 53/247 |
| 5,983,603 | A | * | 11/1999 | Lee ...................... A23G 7/0025 53/446 |
| 7,234,744 | B2 | * | 6/2007 | Osten .................. B25J 15/0616 294/65 |
| 7,390,040 | B2 | * | 6/2008 | Subotincic ...................... 294/65 |
| 7,409,812 | B2 | * | 8/2008 | Gilmore et al. ................ 53/475 |

FOREIGN PATENT DOCUMENTS

| | | | |
|---|---|---|---|
| EP | 0695703 | | 2/1996 |
| EP | 2287076 | | 2/2011 |
| EP | 2497612 | | 9/2012 |
| EP | 2500151 | | 9/2012 |
| ES | 8607858 | † | 11/1986 |
| FR | 2910879 | | 7/2008 |
| JP | 54040775 | | 3/1979 |
| JP | H11-157508 | | 6/1990 |
| JP | 6142881 | † | 5/1994 |
| JP | 09235018 | | 9/1997 |
| JP | 11254367 | † | 9/1999 |
| NL | 8105321 | | 6/1983 |
| WO | WO2009/149322 | * | 10/2009 ............. B65G 47/52 |
| WO | WO2011016968 | † | 2/2011 |

OTHER PUBLICATIONS

European Search Report from European Patent Application No. EP 11157856 dated Oct. 13, 2011.
Caffitaly declaration relating to the delivery of Cama machines to Caffitaly factories; Confirmation of delivery order from CAMA 1 SpA from Jun. 1, 2010 to Mar. 31, 2011; dated Mar. 8, 2013.
CAMA1 SpA Delivery Notes attached to Caffitaly's declaration dated Jun. 25, 2010 and Dec. 27, 2010.
Request for judicial inspection at Caffitaly pending before the Court of Milan; dated Dec. 3, 2013.
Minutes of hearing of Mar. 11, 2013 before the Court of Milan.
Declaration of Mr. Marco Grassili dated Jan. 30, 2014.
Declaration of Mr. Claudio Tosarelli dated Jan. 30, 2014.
Opposition filed Jan. 31, 2014 for EP 2497612.
Polypack web page as it appeared in May 9, 2008; http://web.archive.org/web/20080509065326/http://www.polypack.com/drugs.asp (2 pages).
Polypack, Inc. Affidavit dated Nov. 26, 2013.
Polypack web page link "Tubes" diclosed May 9, 2008; http://web.archive.org/web/20080509065326/http://www.polypack.com/videos/3378.wmv.

* cited by examiner
† cited by third party

GRIPPING HEAD FOR A ROBOT OR MANIPULATOR OF A CARTONING MACHINE

CROSS-REFERENCE TO RELATED APPLICATIONS

This application claims priority to European Patent Application No. 11157856.3 filed on 11 Mar. 2011, the contents of which are incorporated herein, in their entirety, by this reference.

TECHNICAL FIELD

Embodiments of the present invention relate to the field of cartoning machines. Embodiments of the invention relate to a gripping head for a robot or manipulator suitable for use in a cartoning machine.

BACKGROUND

The handling of articles having a substantially tapered shape for example in form of a cup or a small pot is known in the field of cartoning machines. Examples of such articles are yogurt pots, small cups for food or non-food products, coffee capsules. These articles are well known both in the food and non-food industry; their use has considerably increased over the last years having been boosted especially by the continuously growing use of coffee capsules.

A machine for secondary packaging of said articles according to the prior art comprises one or several robots or manipulators which load the articles into carton boxes or cases according to a predefined pattern. The robot or manipulator works with a preset cycle between a station for the arrival of the articles and a delivery station. The articles are supplied to the arrival station for example on one or more tracks or conveyors. The delivery station may coincide with the insertion of the articles into boxes or cases.

Tapered articles are generally arranged alternating an upright article with an article overturned by 180 degrees to save space. Such arrangement is known as nesting of the articles and allows optimal use of space within the box and hence reduced costs for transport and logistics. Adjoining articles in a nested arrangement have a complementary shape, i.e. the head of an article is adjacent to the bottom of another article and vice versa.

However, a nested arrangement is not easy to obtain especially with large production volumes. There are efficient known transport systems capable of forming two parallel rows of articles in which the articles of a row are turned by 180 degrees with respect to articles of the adjacent row, delivering batches of articles that are substantially arranged in a 2×N matrix, formed by a row of upright articles and a row of overturned articles. However, such systems are not able to operate the nesting within the single rows.

As of date, the nested arrangement is costly and difficult to obtain. The known systems in particular are not satisfactory in fields such as that of coffee capsules where the cartoning machine should handle a large number of articles of small dimensions, with a high speed and the need of high flexibility to operate with different formats. Another problem lies in the need of producing boxes with layers (also referred to as levels) of articles in which the articles are alternated in a complementary manner between one layer and the other. For example in the coffee capsules packaging industry it is desirable that the sealing of a capsule always be in contact with the sealing of a capsule of an overlaying layer to avoid damage of the sealing itself. Thus, formats with several levels of capsule require the creation of complementary layers or levels of capsules.

SUMMARY

The problem underlying one or more embodiments of the present invention is to provide the nesting of articles which are supplied on two substantially parallel rows or tracks, where nesting the articles of a row or track with articles of the adjacent row is required. Furthermore, one or more embodiments of the invention aim at providing complementary arrangements of articles of the first and respectively second row, starting from the same input arrangement.

The idea on which one or more embodiments of the present invention is based is to provide the nesting with a robot or manipulator equipped with inverting gripping members, i.e. rotating around a given axis. Thus, the problem is solved by means of a gripping head for a loading robot or manipulator of a cartoning machine, the gripping head comprising a plurality of gripping members, and in which the gripping members are arranged in at least one row according to a longitudinal direction of the gripping head, characterised in that each of the gripping members comprises a gripping section adapted to receive two articles adjacent and on opposite sides with respect to a centerline plane of the gripping section, and in that at least one subset of the gripping members are rotatable by at least 180 degrees around an axis substantially parallel to the plane, the subset comprising at least the gripping members in even index positions or in odd index positions in the longitudinal row of gripping members.

Preferably each of the gripping members of the head is rotatable around a respective axis. The rotation axis preferably belongs to the mentioned centerline plane and more preferably is an axis of substantial symmetry of the respective gripping member. Preferably all the gripping members of the head are rotatable around a respective axis and more preferably the rotation of the single gripping members is independent. Advantageously each gripping member comprises a respective motor or actuator which controls the axial rotation.

The gripping section may comprise two gripping members, such as for example vacuum suction cups, on opposite sides of the centerline plane. In a preferred embodiment, each gripping member comprises vacuum gripping rods or the same gripping member is represented by a rod with a suitable end. More preferably, a gripping member is represented by a rod having an end with two suction cups or equivalent suction-operated gripping members. Suction may be generated through the internally hollow rod. Preferably the gripping members are substantially parallel.

Another aspect of the invention includes providing the gripping head with a plurality of tilting gripping members which can be inclined with respect to a main framework of the head. In one of the embodiments, the tilting gripping members are alternated with gripping members which are termed as fixed. The term of fixed gripping member is used to denote a gripping member possibly rotatable around the axis thereof but unable to tilt with respect to the gripping head. A tilting gripping member is inclinable between a first position of a substantial alignment generally parallel with the fixed gripping members (closed position) and a second position spaced from the fixed members and/or from the resting tiltable members (open position). In some embodiments, the gripping head may comprise gripping members which are tiltable on opposite sides with respect to a median plane.

The fixed members and/or the tiltable members can be rotatable around an axis as defined above. Preferably all the members both fixed and tiltable are rotatable around a respective axis. Hence, and according to a preferred embodiment, a tilting gripping member is provided with a double degree of freedom comprising axial rotation and inclination with respect to the framework.

In a preferred embodiment each tilting gripping member is supported by a respective auxiliary framework which is hinged to the main framework of the gripping head and which is articulated to the main framework for example with a fulcrum.

More preferably the gripping head comprises a plurality of motors or actuators which respectively actuate the axial rotation of each gripping member, and another plurality of motors or actuators which actuate the inclination movement of the tilting gripping members. The motors, both for the axial rotation and for the tilting movement, are preferably pneumatic motors or actuators. The motor which controls the axial rotation of a gripping member and relative transmission means are mounted preferably on the auxiliary framework.

Preferably the gripping members are in alignment, i.e. axis of substantial symmetry of the gripping members—while tilting gripping members, when provided, are in the closed position—rest in the same plane.

An aspect of the invention includes a robot or a manipulator which is preferably provided with the mentioned gripping head. In the present description and in the claims, any reference to a robot shall be intended to a robot or manipulator of the type used in the packaging machines, with any number of degrees of freedom also named axes.

One or more embodiments of the invention allow modifying the arrangement of the articles in a quick and efficient manner and, in particular, allow obtaining the nesting of articles.

The gripping head is able to transform a 2×N matrix of articles into a matrix of articles having the same 2×N dimensions where the even or respectively odd columns are inverted due to the axial rotation of the corresponding gripping members. The head may rotate the gripping members in the positions having an odd index (first, third, . . . ) or an even index (second, fourth, . . . ) of the row and by doing so the head can nest the articles of the two input rows. Preferably a robot according to an embodiment of the invention has a control system that can selectively rotate the gripping members in the even or odd positions.

The degree of freedom of inclination of the tilting gripping members allows increasing a space of distance between adjacent gripping members and allows rotating the gripping members and relative articles even when the pick-up and/or load format, which is generally set by the format according to specification, requires that the gripping members be arranged very close to each other. Thus, the gripping members can arrange in a close set-up for gripping and releasing the product, and in a temporary set-up with open tiltable members during the step of rotating the gripping members and inversion of the respective articles.

In a variant, the gripping head comprises means for spacing (i.e., diverging) and nearing (i.e., compacting) the gripping members with respect to each other in the longitudinal direction. Such effect can be obtained through per se known means such as for example a carriage control. Moving away the gripping members, for example rods, allows obtaining the same effect of the tiltable gripping members or rods, i.e. allow the rotation. Such embodiments shall be considered equivalent.

A preferred application consists in cartooning machines or systems fed by two tracks with a track supplying first articles and a track supplying second articles. The articles defined as first and as second can be of different nature or they can be identical articles but with different spatial orientation. For example, embodiments of the invention can be applied to machines for handling tapered or frusto-conical articles such as cups, pots, coffee capsules and the like, and in which the second articles are identical to the first articles but are overturned by 180 degrees.

For example, a robot or manipulator according to an embodiment of the invention can receive an input of batches of articles substantially arranged as a 2×N matrix in which the articles of one row are turned with respect to the articles of the adjacent row. The robot is capable of selectively inverting the even or odd columns of the matrix, producing as output a 2×N matrix in which the straight and tilted articles are nested with respect to each other. This term is used to indicate that in the two rows of articles generated in output, the first articles are alternated to the second articles.

The possibility of selectively rotating the even or odd columns allows generating matrices of articles which are complementary with respect to each other. For example, an aspect of the invention relates to a method for transferring articles by controlling the robot or manipulator as follows:

generating a first matrix of articles comprising first articles and second articles nested with respect to each other in a first operating cycle;

generating a second matrix of articles complementary to the first matrix, in at least one subsequent operating cycle.

The capacity of generating complementary matrices of articles is particularly useful for loading boxes on several layers.

The term of matrix "generated" by the gripping head (or by the robot) is used to indicate the matrix of articles that the gripping head can deliver to a downstream device, for example a box or case conveyor. The term complementary matrices is used to indicate that given a position (i, j), if the first matrix comprises a first or respectively second article in the position, the second complementary matrix comprises a second or respectively first article in the same position.

A further advantage of one or more embodiments of the invention lies in the fact that the capacity of nesting the articles is located in the robot. Hence, a great flexibility is obtained without modifying the members upstream (conveyor tracks, phasing systems, etc.), which are generally more expensive. Furthermore, the gripping head can be made for example with pneumatic technology which is relatively inexpensive.

The advantages shall be more apparent with the help of the following description and figures, which represent non-limiting examples.

DETAILED DESCRIPTION

Figure 1:
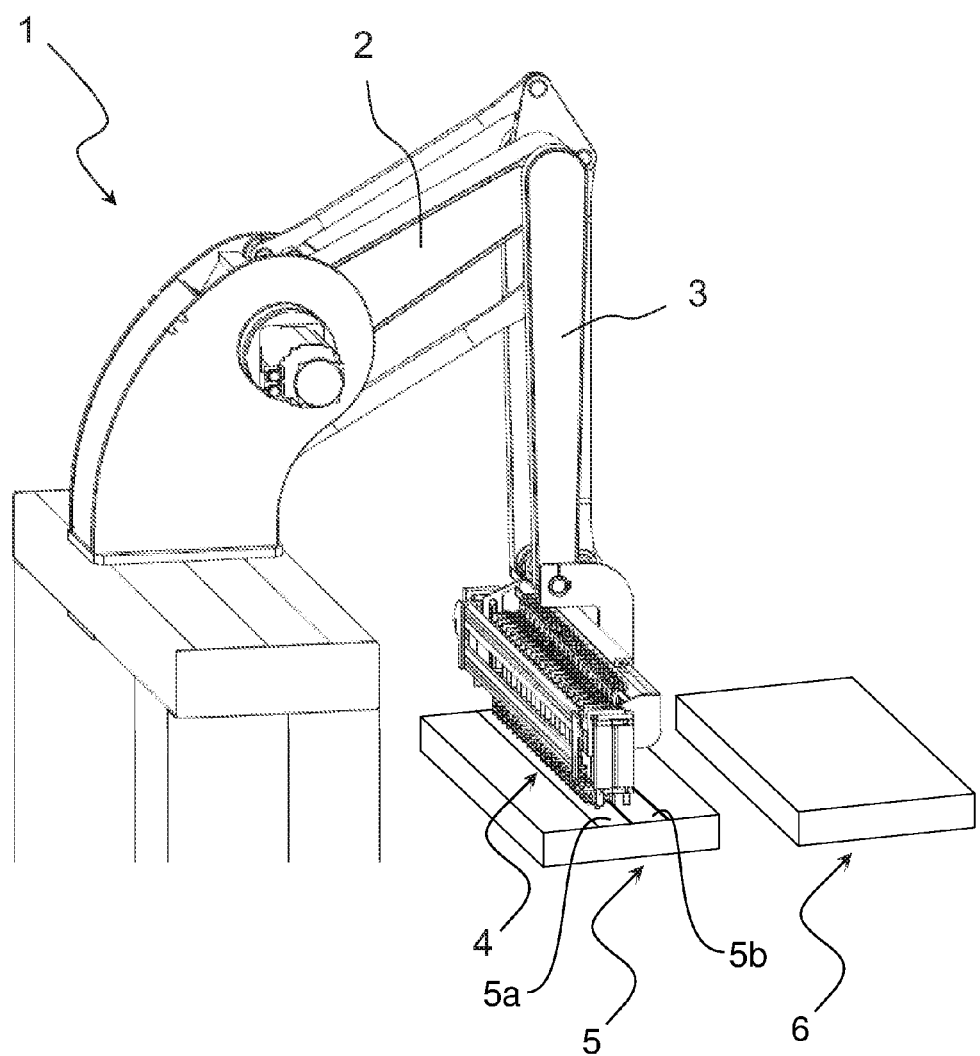
FIG. 1 is a view of a top load robot according to an embodiment of the invention.

FIG. 1 shows a robot 1 provided with: a first arm 2, a second arm 3 articulated to the first arm 2, a gripping head 4 mounted on the second arm 3. The example refers by way of non-limiting example to a top-loading robot with parallel rods. The robot 1 can be part of a cartooning machine and it can be used for example for picking up articles from an input station and transferring them into boxes or cases.

Figure 2:
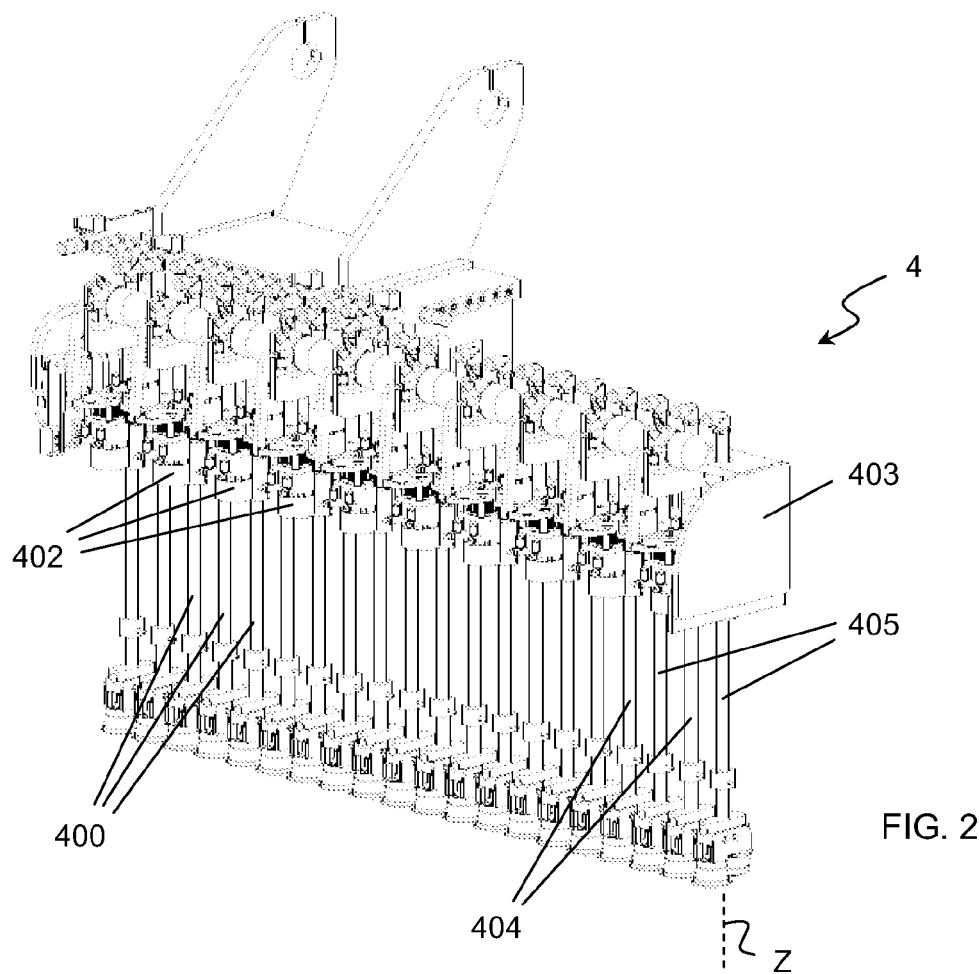
FIG. 2 is a detail of the gripping head of the robot of FIG. 1.

The gripping head 4 comprises a plurality of gripping members which in this case are parallel rods and which are generally indicated with reference 400 (FIG. 2). The rods 400 are substantially rectilinear and parallel each other. In the example, the rods are aligned so that the axes of the rods belong to a common plane; an axis Z of one of the rods is shown in FIG. 2. The rods 400 are carried by a main framework 403 which is fixed or preferably articulated to the second arm 3.

The rods are arranged in a row from a first rod which can be conventionally at one end or the other end of the head 4, to a last rod at the opposite end. Thus, rods are identified in positions defined odd and rods in positions defined even.

A generic gripping rod 400 (FIG. 3) is provided with a gripping section 420 adapted to receive two articles which are located on opposite sides with respect to a centerline plane passing through the axis Z of the rod 400. In the example of the figures, a general rod 400 has a substantially T-shaped end and the end carries two gripping suction cups 401. One of the two suction cups is visible in FIG. 3, the other being hidden by the perspective view. It should be observed that such embodiment is provided by way of non-limiting example.

In the figure there are shown a first article $A_1$ and a second article $A_2$ taken by respective suction cups 401 of the rod. The first and the second article are substantially complementary i.e. a wider part of the first article $A_1$ corresponds to a narrower portion of the second article $A_2$, and vice versa. For example the first article and the second article are identical but turned with respect to each other by 180 degrees. The articles are for example coffee capsules in which the narrower part corresponds to the bottom of the capsule and the wider part corresponds to the head with sealing.

At least some of the rods 400 can rotate around the axis Z thereof. The rotation is defined axial rotation. Preferably, each of the rods 400 has an axial rotation freedom independently from the other rods: for example, the head 4 comprises a plurality of motors or pneumatic actuators 402, each motor 402 being associated to a respective rod 400 for controlling the axial rotation of the rod around the respective axis Z. Some of the motors 402 are indicated in FIG. 2.

Due to the arrangement of the rods 400 and of the gripping members 401, the head 4 is capable of handling at each operating cycle a 2×N matrix of articles, in which N is the number of rods 400. Each rod carries a column (formed by two articles) of the matrix. Furthermore, it can be understood that a rotatable rod is capable of inverting the position of a respective pair of articles (or column of the matrix) such as for example the articles $A_1$, $A_2$ of FIG. 3. This inversion may occur during the operating cycle of the robot and precisely during the displacement from a picking up area to a delivery area.

The head 4 advantageously comprises a series of tiltable rods which are preferably alternated with non-tiltable rods which are otherwise referred to as fixed rods. The tiltable rods, in the example, have a further degree of freedom beside the axial rotation around Z, being inclinable with respect to the main framework 403. FIG. 2 shows two tiltable rods 404 which are alternated with two fixed rods 405.

Each tilting rod 404 has an oscillation fulcrum with respect to the main framework 403. The tiltable rods 404 are movable between a first position in which they are parallel to the fixed rods 405, and a second inclined position where they are spaced away from the plane of parallelism of the fixed rods. With reference to the tiltable rods, the term "closed" rods is also used to indicate the rest position aligned to the fixed rods, as shown in FIG. 2, and the term of "open" rods is used for indicating the inclined position away from the plane of the fixed rods.

Figure 4:
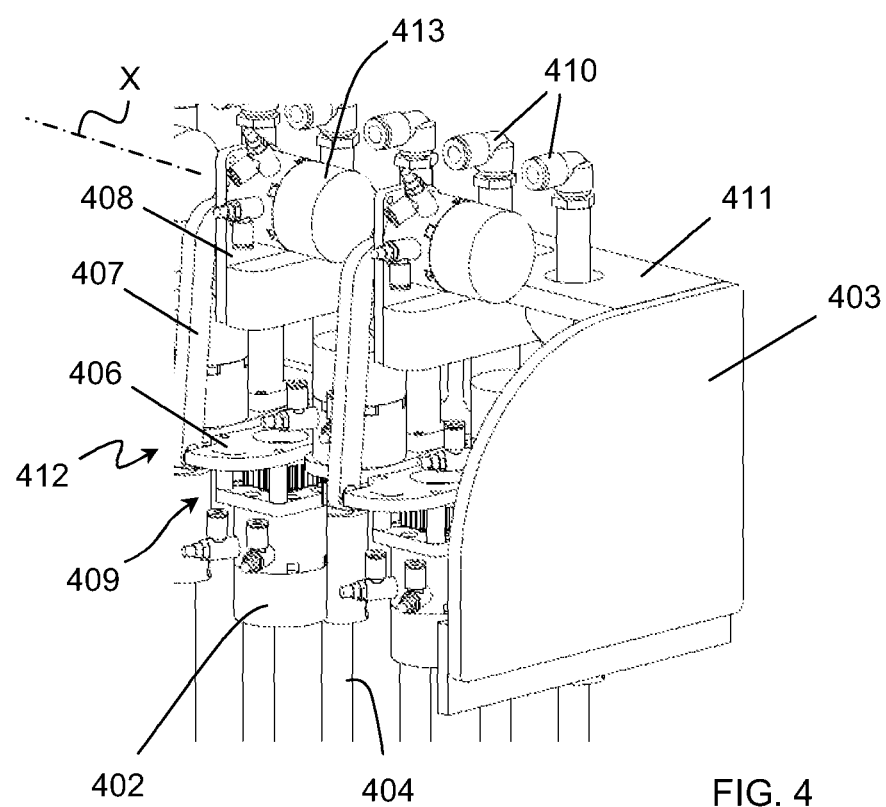
FIG. 4 is a detail of the gripping head of FIG. 2.

FIG. 4 shows an embodiment in which a general tilting rod 404 is supported by a respective framework 412. The framework 412 essentially comprises a plate 406 which carries the rod 404 and relative motor for the axial rotation 402, and an arm 407.

The arm 407 has a fulcrum with respect to a fixed wing 408 integral with the main framework 403, the arm 407 being able of oscillating due to the fulcrum around an axis represented as X. The axis X is substantially parallel to the longitudinal direction of the head 4 and it is parallel to a plane of alignment to which the axes Z of the rods (with tiltable rods closed i.e. resting) are parallel, and preferably belong.

Figure 5:
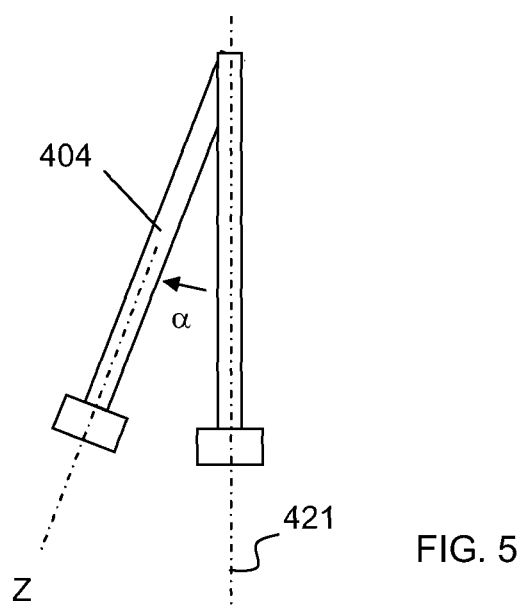
FIG. 5 is a diagram showing the possibility of inclination of the tiltable rods of the head of FIG. 2.

The inclination movement of the tilting rod 404 is exemplified in FIG. 5 which shows the rod 404 in the position of alignment with the fixed rods and in a position inclined by an angle α. The figure also shows with the reference 421 the line of the plane of the rods 400, i.e. of the plane of the axes Z of the fixed rods as well as of the tiltable rods in the rest condition. The axis X of FIG. 4 is perpendicular to the plane of FIG. 5.

The inclination movement of a tilting rod 404 is set by a respective motor or actuator 413 for example through a pinion which meshes a toothed wheel integral with the arm 407 or through a suitable linkage, according to non-essential details and they may be provided for by a man skilled in the art.

In FIG. 4 it is also shown that upper ends of the rods 400 carry a connector 410 for connecting to a vacuum source. Thus, the hollow rod allows creating a suction up to the gripping suctioning elements 401. It should be observed that in order to allow the opening of the tiltable rods 404 the rods 404 advantageously pass through a slot—instead of a hole—of the upper plate 411 of the framework 403.

The motor 402 controls the rotation around the axis Z of the rod 404 through a gear 409 which is partly visible in FIG. 4 and which essentially comprises a pinion actuated by the motor 402 and a toothed wheel keyed on the rod. Such details are preferably identical for all the rods both fixed and tiltable. In the case of the tiltable rods, the group of motor 402 and gear 409 is integral with the framework 412. The motors 402 can be offset as shown in the figure in order to reduce the overall dimensions.

Preferably the motors 402 that impart the axial rotation and the motors 413 that actuate the tiltable rods are pneumatic motors. The pneumatic connections are not shown in the figures. The motors are controlled by opening and closing a series of solenoid valves according to a technique per se known in the pneumatic industry and which is thus not described in detail. In any case, reference to pneumatic motors should be deemed not to be restrictive and pneumatic or any other type of actuators can be used according to other embodiments of the invention.

Figure 3:
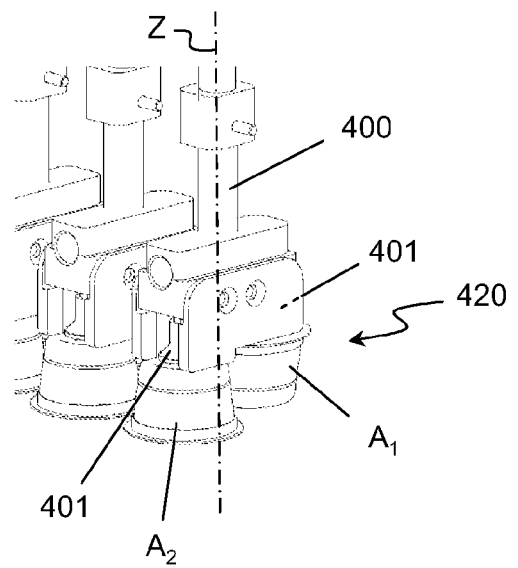
FIG. 3 is a detail of the end of the rods of the gripping head of FIG. 2.

The opening movement takes the rods 404 outside the plane of alignment 421 and hence allows the axial rotation and the inversion of the articles $A_1$ and $A_2$ even when the rods are very close and/or the overall dimension of the articles would cause interference as observable for example in the detail of FIG. 3. In another embodiment (not illustrated), a device is provided for moving away and compacting the rods in the longitudinal direction and/or grouping the rods in subsets according to the required format, for example to allow the head to load several boxes for each work travel. The moving away and compacting can be obtained with a carriage system actuated by a template according to per se known technique.

The system for controlling the robot 1 operates consequently. For example a work cycle of the robot 1 comprises the steps of:
 a) gripping the product with the all rods 400 aligned namely with the tiltable rods 404 in "closed" position;
 b) opening of the tiltable rods 404;
 c) axial rotation around Z of the rods 404 while they are open, or axial rotation of the fixed rods 405 while the tiltable rods 404 are open;
 d) closing of the tiltable rods 404 bringing all the rods back in alignment;
 e) release of the product;
 f) possible reverse rotation of the rods rotated at point c).

In the step c) the head may equally rotate the fixed rods or the open tiltable rods, due to the increase of the distance between centres between the rods. The optional step f) may be required if the end of the rods is asymmetric and/or if the gripping members 401 are configured in a specific manner at one of the rows of the input matrix. In this case, the step f) returns the rods in the original configuration. If required, also the step f) can be combined with the inclination of the tiltable rods 404, even though in the absence of the overall dimension caused by the product this may not be required, i.e. in absence of the product the distance between centres is sufficient to allow the axial rotation of the rods. Steps b) to d) are carried out while the robot moves from the arrival station 5 to a delivery station 6 (shown in FIG. 1).

Figure 6:
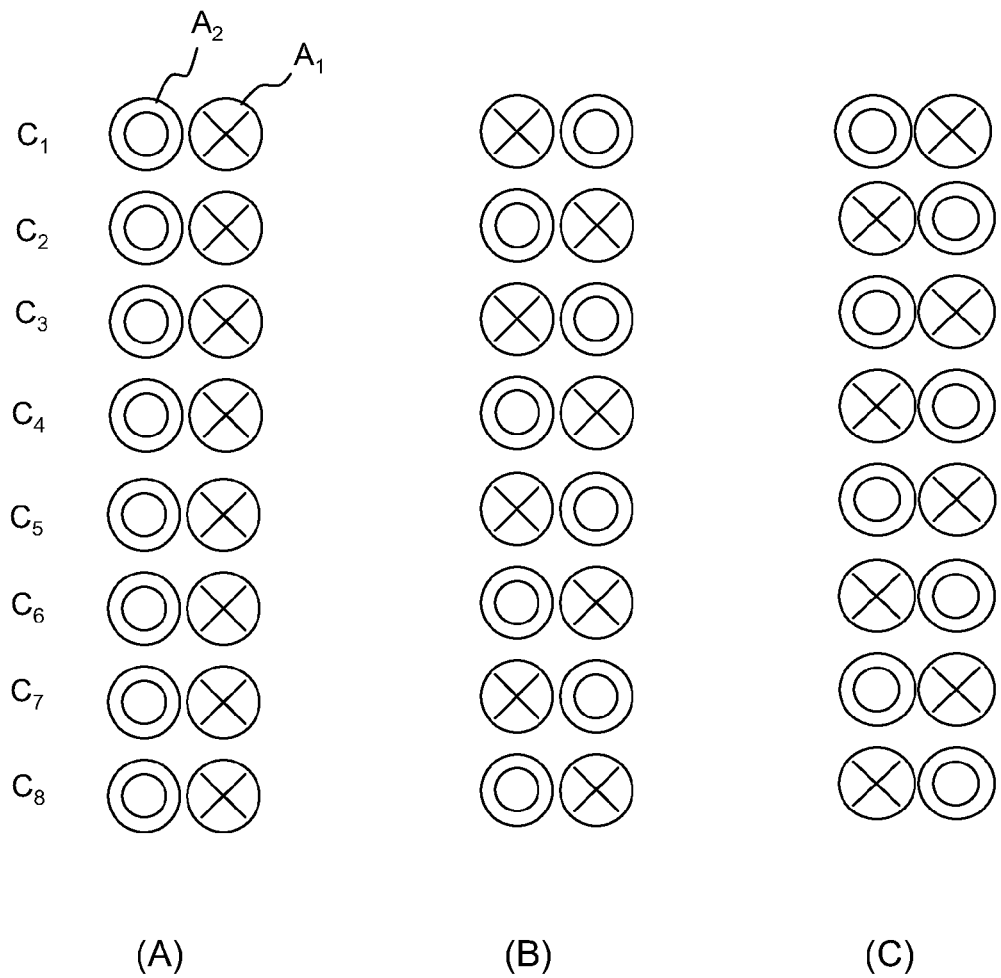
FIG. 6 exemplifies some arrangements of articles that can be produced by the robot of FIG. 1.

The operation is further exemplified by FIG. 6 showing examples of arrangement of the input and output articles. An example of 2×N input matrix is shown in FIG. 6 (A). Such matrix may be produced for example by a conveying system with two tracks (such as tracks 5*a*, 5*b*, shown in FIG. 1) provided with devices capable of overturning (capsizing) the articles of a track. The matrix hence has a row of first articles A1 "straight" and a row of articles A2 overturned. The columns of the matrix are indicated from C1 to CS; each column is formed by a straight article and an overturned article.

FIG. 6 B) shows a matrix of the articles produced in output by the gripping head 4. In the example, the gripping head has swapped the positions of the articles in the even columns C2, C4, . . . by rotating the respective rods 400, obtaining a nested arrangement of the articles, in which straight articles $A_1$ and overturned $A_2$ are alternated in each row. FIG. 6 C) shows a matrix of articles complementary to that of FIG. 6 B), which can be obtained from the same input matrix by rotating the rods corresponding to the odd columns C1, C3, . . . . The complementary arrangements of FIG. 6 B) and FIG. 6 C) can for example be applied to provide formats on multiple levels. Such complementary arrangement can for example be desirable to obtain contact between homologous surfaces of the articles, for example while handling coffee pods, to guarantee bottom to bottom and sealing to sealing contact.

The invention claimed is:

1. A cartoning machine for transferring articles from a picking area to a delivery area, the cartoning machine comprising:
 a first station comprising a first track and a second track substantially parallel to the first track, the first track is supplied with first articles and the second track is supplied with second articles to form an input pattern of articles comprising a first row of first articles on the first track, and a second row of articles on the second track, the first row being substantially parallel to the second row;
 a second station;
 a gripping head for transferring the articles from the first station to the second station, the gripping head comprising:
  a plurality of gripping members arranged in a longitudinal row along a centerline plane of the gripping head, the centerline plane passing through each of the plurality of gripping members, and the gripping members including corresponding gripping sections, each gripping section of the corresponding gripping sections being adapted to receive two adjacent articles and is rotatable to swap positions of the two articles on opposite sides of the centerline plane and the gripping members are rotatable by at least about 180 degrees around an axis substantially parallel to the centerline plane;
 wherein the gripping head is controlled to load a batch of articles from the first station, each gripping member picking one right article from said first track and one capsized article from said second track, in a manner that the gripping head is loaded with a row of right articles and a substantially parallel row of capsized articles;
 a controller operably coupled to the gripping head, the controller being configured to selectively rotate the gripping members in an even index position or an odd index position in the longitudinal row of gripping members, in a manner to swap the position of the articles carried by the rotated gripping members, the selective rotation of either even or odd gripping members resulting in the gripping head carrying a modified pattern of two substantially parallel rows of articles wherein right articles alternate with capsized articles within each of said two substantially parallel rows;
 wherein said gripping head is further controlled to deliver said modified pattern to said second station of the cartoning machine.

2. The cartoning machine according to claim 1, wherein the gripping head is capable of selectively rotating the gripping members in even or odd positions in the row.

3. The cartoning machine according to claim 1, wherein the rotation axis is an axis of substantial symmetry of the respective gripping member.

4. The cartoning machine according to claim 1, wherein the plurality of gripping members comprising tiltable gripping members configured to be inclined with respect to a main framework of the gripping head to increase a space of distance between centres in the longitudinal direction between adjoining gripping members.

5. The cartoning machine according to claim 4, wherein the tiltable gripping members being alternated to non-tiltable fixed gripping members, each tiltable gripping member being inclinable between a first position of substantial alignment generally parallel to the fixed gripping members, and a second position where the tiltable member is spaced away from the fixed members.

6. The cartoning machine according to claim 5, wherein each of the tiltable gripping members being supported by an auxiliary framework, and the auxiliary framework having at least one inclination fulcrum with respect to the main framework of the gripping head.

7. The cartoning machine according to claim 6, further comprising a plurality of respective motors or actuators configured for controlling the inclination of each of the tiltable gripping members.

8. The cartoning machine according to claim 6, further comprising a respective actuation group for the rotation of each gripping member, the actuation group comprising at least one motor or actuator and transmission means, and wherein the motor and the transmission means of a tiltable gripping member are mounted on the respective auxiliary framework.

9. The cartoning machine according to claim 1, further comprising means for spacing the gripping members with respect to each other in the longitudinal direction.

10. The cartoning machine according to claim 1, wherein the gripping members comprise or are represented by substantially parallel rods.

11. A robot or manipulator for the cartoning machine according to claim 1.

12. The cartoning machine of claim 1, wherein the rotation axis lies substantially in the centerline plane.

13. A cartoning machine for transferring articles from a picking area to a delivery area, the cartoning machine comprising:
- a gripping head comprising:
  - a plurality of gripping members arranged in a longitudinal row along a centerline plane of the gripping head, the centerline plane passing through each of the plurality of gripping members, and the gripping members including corresponding gripping sections adapted to receive N number of columns of two articles next to each other and position the two articles on opposite sides of the centerline;
  - wherein one of the two articles has a straight orientation and another of the two articles has a capsized orientation;
  - wherein at least one subset of the gripping members are rotatable by at least about 180 degrees around a rotation axis substantially parallel to the centerline plane, the at least one subset of the gripping members comprising at least some of the gripping members in an even index position or at least some of the gripping members in an odd index position in the longitudinal row of the plurality of gripping members;
- a controller operably coupled to the gripping head, the controller being configured to rotate the gripping members in one or more of the even index position or the odd index position in a manner that each of the articles having the straight orientation is positioned next to at least two articles having the capsized orientation, and the two articles having the capsized orientation are positioned on opposing sides of the centerline plane; and
- wherein the plurality of gripping members comprise tiltable gripping members configured to be inclined with respect to a main framework of the gripping head to increase of distance between centres in the longitudinal direction between gripping sections of adjacent gripping members.

14. The cartoning machine according to claim 13, wherein the tiltable gripping members being alternated to non-tiltable fixed gripping members, each tiltable gripping member being inclinable between a first position of substantial alignment generally parallel to the fixed gripping members, and a second position where the tiltable member is spaced away from the fixed members.

15. The cartoning machine according to claim 14, wherein each of the tiltable gripping members being supported by an auxiliary framework, and the auxiliary framework having at least one inclination fulcrum with respect to the main framework of the gripping head.

16. The cartoning machine according to claim 15, further comprising a plurality of respective motors or actuators configured for controlling the inclination of each of the tiltable gripping members.

17. The cartoning machine according to claim 15, further comprising a respective actuation group for the rotation of each gripping member, the actuation group comprising at least one motor or actuator and transmission means, and wherein the motor and the transmission means of a tiltable gripping member are mounted on the respective auxiliary framework.

* * * * *